(12) United States Patent
Chen et al.

(10) Patent No.: US 12,438,119 B2
(45) Date of Patent: Oct. 7, 2025

(54) INTELLIGENT DISPENSING ADJUSTMENT SYSTEM AND METHOD THEREOF

(71) Applicant: KULICKE AND SOFFA HI-TECH CO., LTD., New Taipei (TW)

(72) Inventors: Lu-Min Chen, Taipei (TW); Tsung-Lin Tsai, Taipei (TW)

(73) Assignee: Kulicke and Soffa Hi-Tech Co., Ltd., New Taipei (TW)

( * ) Notice: Subject to any disclaimer, the term of this patent is extended or adjusted under 35 U.S.C. 154(b) by 673 days.

(21) Appl. No.: 17/865,200

(22) Filed: Jul. 14, 2022

(65) Prior Publication Data

US 2023/0420406 A1 Dec. 28, 2023

(30) Foreign Application Priority Data

Jun. 27, 2022 (TW) .................................. 111123846

(51) Int. Cl.
*B32B 41/00* (2006.01)
*H01L 21/56* (2006.01)
*H01L 21/67* (2006.01)
*H01L 23/00* (2006.01)

(52) U.S. Cl.
CPC .............. *H01L 24/75* (2013.01); *H01L 21/56* (2013.01); *H01L 21/67126* (2013.01); *H01L 24/83* (2013.01); *H01L 24/32* (2013.01); *H01L 24/743* (2013.01); *H01L 2224/32221* (2013.01); *H01L 2224/75611* (2013.01); *H01L 2224/75901* (2013.01); *H01L 2224/83825* (2013.01); *H01L 2224/83862* (2013.01); *H01L 2224/83908* (2013.01); *H01L 2924/351* (2013.01)

(58) Field of Classification Search
CPC ... H01L 24/75; H01L 21/56; H01L 21/67126; H01L 24/83; H01L 24/32; H01L 24/743; H01L 2224/32221; H01L 2224/75611; H01L 2224/75901; H01L 2224/83825; H01L 2224/83862; H01L 2224/83908; H01L 2924/351; H01L 23/562; H01L 21/563
USPC .................... 156/60, 64, 350, 351, 378, 379
See application file for complete search history.

(56) References Cited

FOREIGN PATENT DOCUMENTS

WO WO-2020176079 A1 * 9/2020 ........... B29C 64/112

* cited by examiner

*Primary Examiner* — Michael N Orlando
*Assistant Examiner* — Joshel Rivera
(74) *Attorney, Agent, or Firm* — Christopher M. Spletzer, Sr.

(57) ABSTRACT

One embodiment of the present invention discloses an intelligent dispensing adjustment system and the method thereof. The system can dynamically detect the fluid dispensing amount of a fluid dispensing unit via a calculating unit having an intelligent dispensing mechanism and keeps monitoring the dispensing situation of the fluid material so as to automatically adjust the fluid dispensing amount of the fluid dispensing unit. The system can adjust the fluid dispensing amount of the fluid dispensing unit by obtaining the information of the state of previously dispensing the fluid material via a closed loop, which can solve the problems, of prior art, that the defects of products may be incurred because the state of the fluid material is hard to control (e.g., the fluid material is insufficient or overflows).

20 Claims, 7 Drawing Sheets

INTELLIGENT DISPENSING ADJUSTMENT SYSTEM AND METHOD THEREOF

BACKGROUND OF THE INVENTION

1. Field of the Invention

The present invention relates to an intelligent dispensing adjustment system and method thereof, in particular to a system and the method thereof capable of adjusting the fluid dispensing amount according to the state of previously dispensing the fluid material via a closed loop.

2. Description of the Prior Art

In recent years, in order to satisfy the requirements of various electronic products, the substrate to which the chip is bonded is usually a non-ceramic material. As the CTE (Coefficient of Thermal Expansion) of the chip is different from that the substrate, and the defects of the semiconductor may be incurred due to the thermal stress generated during the packaging process.

With a view to eliminate the above thermal stress, the currently available technologies are to fill the space between a chip and a substrate with the underfill to reduce the defects of semiconductor products. These technologies, capable of filling the gap between the chip and the substrate with the underfill, include molding, dispensing, etc. Regarding molding, when the thickness of the substrate is extremely low (e.g., the substrate is a thin-film substrate), the glue-injecting pressure caused by molding tends to incur the displacement of the substrate. Thus, molding is not suitable for chip packaging if the thickness of the substrate of the chip is extremely low.

Regarding dispensing, dispensing is to fill the L-shape, U-shape or I-shape gap around the chip with the underfill. The underfill "diffuses" into the gap between the chip and the substrate due to capillary. The occurrence of capillary depends on the surface tension, relative to the chip and the substrate, of the underfill, and the heating temperature thereof, so that the gap between the chip and the substrate can be filled up and sealed by the underfill. However, the filling process by capillary may take a lot of time and it is difficult to control the diffusion direction of the underfill. Therefore, the filling efficiency is low and the quality control is also hard to achieve. If uneven diffusion is caused due to insufficient filling time, air bubbles may be generated between the chip and the substrate, which may result in the defects of semiconductor products because the semiconductor products are not properly sealed by the underfill.

Moreover, with advanced development of electronic products, there are various materials applicable to chips and substrates of the currently available technologies. However, the gaps between different chips and different substrates are also different. In the same chip, the gaps between different positions of the chip and the substrate are also different. As a result, if the dispensing of the underfill cannot be dynamically adjusted at any time, the underfill may overflow to contact other electronic components (such as pads, etc.) or may unevenly diffuse because the amount of the underfill is insufficient, which may result in the defects of semiconductor products.

In addition, the technical applications of fluid dispensing also includes "caulking". That is to say, the grooves of products, such as semiconductor substrates, panels or other similar products, can be filled with the underfill. However, as the currently available technologies cannot dynamically adjust the dispensing of the underfill, the underfill may overflow to contact other electronic components or may unevenly diffuse because the amount of the underfill is insufficient, which may result in the defects of semiconductor products.

SUMMARY OF THE INVENTION

In view of the above-mentioned shortcomings of the prior art, the inventor of the present invention has tried hard to innovate in order to improve prior art. After conducting research and development for many years, the inventor of the present invention has successfully developed an intelligent dispensing adjustment system and the method thereof.

The embodiments of the present invention disclose an intelligent dispensing adjustment system and the method thereof. The system can dynamically detect the fluid dispensing amount of a fluid dispensing unit via a calculating unit having an intelligent dispensing mechanism and keeps monitoring the dispensing situation of the fluid material so as to automatically adjust the fluid dispensing amount of the fluid dispensing unit, which can solve the problems, of prior art, that the defects of products may be incurred because the state of the fluid material is hard to control (e.g., the fluid material is insufficient or overflows).

To achieve the foregoing objective, one embodiment of the present invention provides an intelligent dispensing adjustment system, which includes: a fluid dispensing unit, an optical measuring unit and a calculating unit. The fluid dispensing unit fills a target area with a fluid material to execute a $N^{th}$ dispensing step; N is a constant. The optical measuring unit dynamically detects the state of the fluid material in the target area and generate a $N^{th}$ 3-dimension (3D) fluid signal. The calculating unit is electrically connected to the fluid dispensing unit and the optical measuring unit, and receives the $N^{th}$ 3D fluid signal to obtain the state of the fluid material. The calculating unit compares the state of the fluid material with a predetermined fluid state value and transmits a $N^{th}$ fluid amount adjustment signal to the fluid dispensing unit, such that the fluid dispensing unit adjusts the fluid dispensing amount thereof according to the $N^{th}$ fluid amount adjustment signal.

In one embodiment of the present invention, the target area is the fluid input end of the gap between a chip and a substrate.

In one embodiment of the present invention, the state of the fluid material includes the fluid volume, the fluid weight, the height of the fluid material in the gap, the width of the fluid material in the gap, or the ratio of the space, filled with the fluid material, of the gap to the total space of the gap.

In one embodiment of the present invention, the target area is a groove.

In one embodiment of the present invention, the state of the fluid material includes the fluid volume, the fluid weight, the height of the fluid material in the groove, the width of the fluid material in the groove, or the ratio of the space, filled with the fluid material, of the groove to the total space of the groove.

In one embodiment of the present invention, the fluid dispensing unit is a glue dispensing unit. The fluid material is a glue. The optical measuring unit is a laser ranger, a confocal laser scanning microscopy, the combination of a femtosecond laser and a confocal microscopy, a confocal laser, a 3D measuring device, an ultrasonic measuring device, an interferometer or a laser triangulation measuring device.

In one embodiment of the present invention, the optical measuring unit includes at least one visual module. The visual module is a CCD (charge-coupled device) camera, a CCD image sensor, a CMOS (complementary metal-oxide-semiconductor) image sensor, a CMOS camera, an optical microscopy, a scanning electron microscopy or a transmission electron microscopy.

To achieve the foregoing objective, another embodiment of the present invention provides an intelligent dispensing adjustment method, which includes the following steps: a $N^{th}$ dispensing step, wherein a fluid dispensing unit fills the $N^{th}$ fluid input end between a chip and a substrate with a fluid material, such that the fluid material diffuses toward the fluid diffusing end between the chip and the substrate so as to fill the gap between the chip and the substrate with the fluid material; N is a constant; a $N^{th}$ detecting step, wherein an optical measuring unit dynamically detects the state of the fluid material in the gap between the chip and the substrate, and transmits a $N^{th}$ 3D fluid signal to a calculating unit; a $N^{th}$ adjusting step, wherein the calculating unit controls the fluid dispensing amount of the fluid dispensing unit according to the $N^{th}$ 3D fluid signal; and a $N+1^{th}$ dispensing step, wherein the fluid dispensing unit, adjusted by the calculating unit, fills a $N+1^{th}$ fluid input end between the chip and the substrate with the fluid material.

In one embodiment of the present invention, the method further includes, after the N+1 dispensing step, the following steps: a $N+1^{th}$ detecting step, wherein the optical measuring unit dynamically detects the state of the fluid material in the gap between the chip and the substrate, and transmits a $N+1^{th}$ 3D fluid signal to the calculating unit; a $N+1^{th}$ adjusting step, wherein the calculating unit controls the fluid dispensing amount of the fluid dispensing unit according to the $N+1^{th}$ 3D fluid signal; and a $N+2^{th}$ dispensing step, wherein the fluid dispensing unit, adjusted by the calculating unit, fills a $N+2^{th}$ fluid input end between the chip and the substrate with the fluid material.

To achieve the foregoing objective, still another embodiment of the present invention provides an intelligent dispensing adjustment method, which includes the following steps: a $N^{th}$ dispensing step, wherein a fluid dispensing unit fills the groove with a fluid material in order to perform caulking for the groove; N is a constant; a $N^{th}$ detecting step, wherein an optical measuring unit dynamically detects the state of the fluid material in the groove, and transmits a $N^{th}$ 3D fluid signal to a calculating unit; and a $N^{th}$ adjusting step, wherein the calculating unit controls the fluid dispensing amount of the fluid dispensing unit according to the $N^{th}$ 3D fluid signal.

According to the above embodiments, the intelligent dispensing adjustment system and the method thereof design the optical measuring unit, the fluid dispensing unit and the calculating unit to be a closed loop. Thus, after the fluid dispensing unit dispenses the fluid material for one time, the calculating unit can obtain the state (e.g., the volume or weight) of the fluid material according to the 3D information, measured by the optical measuring unit, of the fluid material with an aim of adjusting the fluid material dispensing by the fluid dispensing unit at any time. The intelligent dispensing adjustment system and the method thereof can adjust the fluid dispensing amount of the fluid dispensing unit by obtaining the feedback information of previously dispensing the fluid material via the closed loop, which can solve the problems, of prior art, that the defects of products may be incurred because the state of the fluid material is hard to control (e.g., the fluid material is insufficient or overflows).

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DETAILED DESCRIPTION OF THE PREFERRED EMBODIMENT

The following description is about embodiments of the present invention; however it is not intended to limit the scope of the present invention.

Figure 1:
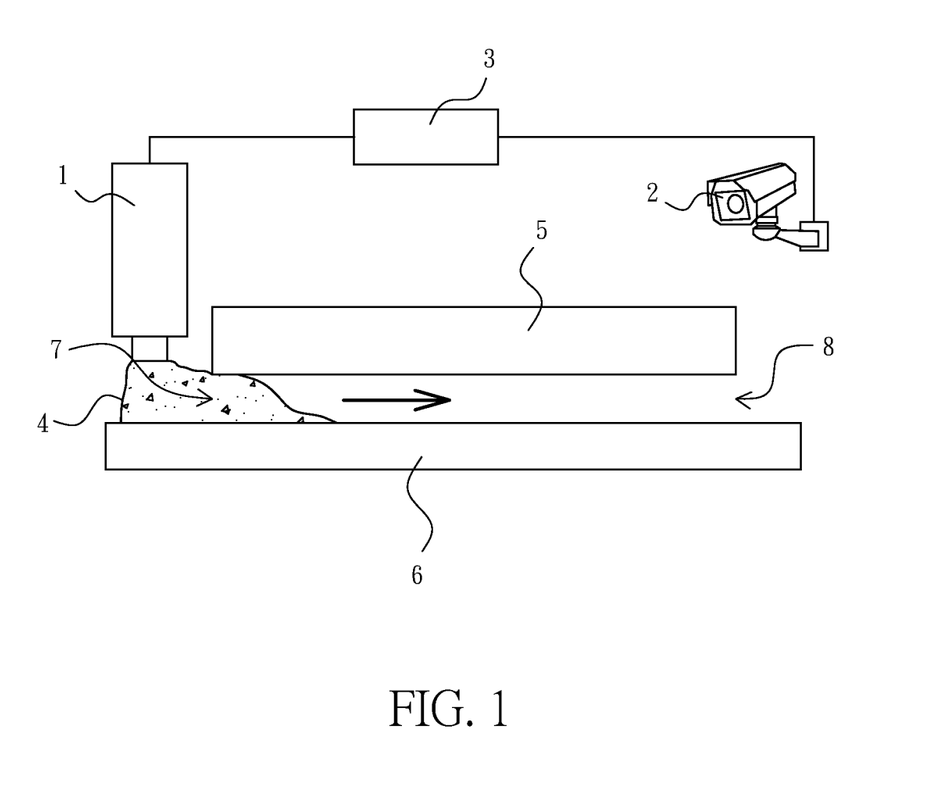
FIG. 1 is the schematic view of an intelligent dispensing adjustment system for filling a target area (the gap between a chip and a substrate) with a fluid material in accordance with one embodiment of the present invention.
Figure 2:
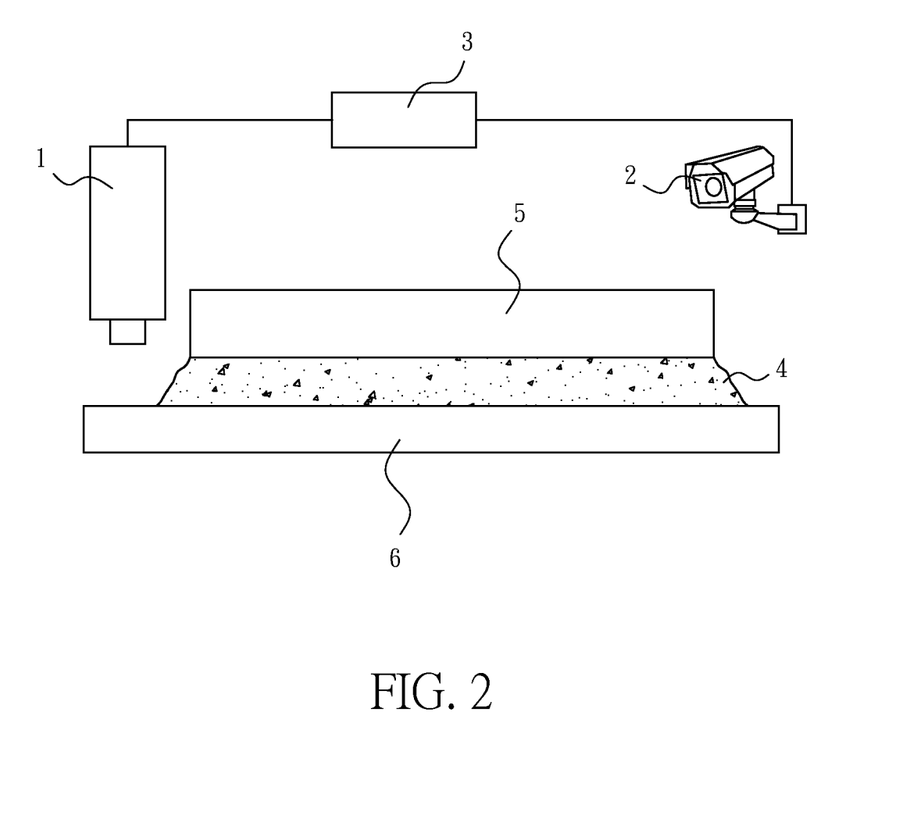
FIG. 2 is the schematic view of the result of the target area (the gap between the chip and the substrate) being filled up with the fluid material in accordance with one embodiment of the present invention.

Please refer to FIG. 1 and FIG. 2. FIG. 1 is the schematic view of an intelligent dispensing adjustment system for filling a target area (the gap between a chip and a substrate) with a fluid material in accordance with one embodiment of the present invention. FIG. 2 is the schematic view of the result of the target area (the gap between the chip and the substrate) being filled up with the fluid material in accordance with one embodiment of the present invention. As shown in FIG. 1 and FIG. 2, the intelligent dispensing adjustment system includes a fluid dispensing unit 1, an optical measuring unit 2 and a calculating unit 3.

The following content will describe the detailed structure of each of the element of the intelligent dispensing adjustment system. However, the following content is just for illustration instead of limiting the scope of the present invention.

In this embodiment, the gap between a chip 5 and a substrate 6 can be considered a target area. The fluid dispensing unit 1 fills the gap between the chip 5 and the substrate 6 with a fluid material 4 and the calculating unit 3 controls the fluid dispensing amount of the fluid dispensing unit 1.

The type and structure of the fluid dispensing unit 1 are not limited, which may be any currently available devices known by those skilled in the art, such as dispensing valve, glue outputting unit, etc. In one embodiment, the fluid dispensing unit 1 is a glue outputting unit, such as glue dispensing needle, etc. Besides, the type of the fluid material 4 is not limited, which may be glue, soldering paste, adhesive agent, sealant, underfill or other proper materials. In one embodiment, the fluid material 4 is glue. The gap between the chip 5 and the substrate 6 may include two parts, including a fluid input end 7 and a fluid diffusing end 8. The fluid input end 7 is the inlet of the fluid material 4 outputted by the fluid dispensing unit 1. The fluid material 4 flows into the gap between the chip 5 and the substrate 6 through the fluid input end 7, and then diffuses to the fluid diffusing end 8 via capillarity. In one embodiment, the fluid material 4 is a thermosetting insulant and the gap between the chip 5 and the substrate 6 can be filled with this material. In general, the fluid material 4 does not cover the chip 5 and the fluid material 4 has a proper fluidity before solidifying due to heat, such that the gap between the chip 5 and the substrate 6 can be filled with the fluid material 4 via capillarity. When the fluid dispensing unit 1 is dispensing the fluid material 4, the fluid material 4 is properly heated by the heating device (not shown in the drawings), which can make the fluid material 4 have a great fluidity. Thus, the fluid material 4 can diffuse into the gap between the chip 5 and the substrate 6 so as to fill the gap.

The state of the fluid material 4 may include diffusing speed, diffusing distribution, thickness of fluid material 4, etc. In one embodiment, the state of the fluid material 4 may include fluid volume, fluid weight, height of the fluid material 4 in the gap, width of the fluid material 4 in the gap, ratio of the space, filled with the fluid material 4, of the gap to the total space of the gap, etc.

The fluid dispensing unit 1 is electrically connected to the calculating unit 3 and controlled by the calculating unit 3. The fluid dispensing amount of the fluid dispensing unit 1 can be accurately controlled by the calculating unit 3. The way of electrically connecting the fluid dispensing unit 1 and the calculating unit 3 is not limited. For instance, the calculating unit 3 can control the fluid dispensing amount of the fluid dispensing unit 1 by controlling the control valve (not shown in the drawings). The control valve can be disposed at any positions of the fluid dispensing unit 1; the control valve may be a non-return valve, a solenoid valve, a one-way valve, etc. In one embodiment, the calculating unit 3 can transmit an expansion signal to the control valve of the fluid dispensing unit 1, which can increase the fluid dispensing amount of the fluid dispensing unit 1. Alternatively, the calculating unit 3 can transmit a retraction signal to the control valve of the fluid dispensing unit 1, which can decrease the fluid dispensing amount of the fluid dispensing unit 1. Moreover, the calculating unit 3 can also transmit an off signal to the control valve of the fluid dispensing unit 1, which can stop the fluid dispensing unit 1 dispensing the fluid material 4.

The optical measuring unit 2 can dynamically detect the state of the fluid material 4 in the gap between the chip 5 and the substrate 6 to generate a $N^{th}$ 3D fluid signal and transmit the $N^{th}$ 3D fluid signal to the calculating unit 3; N is a constant. The type and the structure of the optical measuring unit 2 are not limited. For instance, the optical measuring unit 2 may be a proximity switch, a capacitive type transducer, a proximity sensor, an optical sensor or other similar detecting devices.

The optical measuring unit 2 is electrically connected to the calculating unit 3. The position and the way of installing the optical measuring unit 2 are not limited. Taking the view point of increasing the packaging efficiency into consideration, the optical measuring unit 2 is preferably disposed at the side close to the fluid diffusing end 8 and can move to the position corresponding to the fluid diffusing end 8 so as to perform dynamical detection.

In one embodiment, the optical measuring unit 2 may be a laser ranger, a confocal laser scanning microscopy, the combination of a femtosecond laser and a confocal microscopy, a confocal laser, a 3D measuring device, an ultrasonic measuring device, an interferometer or a laser triangulation measuring device. Alternatively, the optical measuring unit 2 may include at least one upper visual module and at least one lateral visual module. The upper visual module and the lateral visual module may CCD (charge-coupled device) cameras, CCD image sensors, CMOS (complementary metal-oxide-semiconductor) image sensors, CMOS cameras, optical microscopies, scanning electron microscopies, transmission electron microscopies, etc. The state of the dispensing of the fluid material 4 can be detected by the visual detectors or lasers and the calculating unit 3 can adjust the fluid dispensing amount of the fluid dispensing unit 1 at any time, which can solve the problems, of prior art, that the defects of products may be incurred because the state of the fluid material is hard to control (e.g., the fluid material is insufficient or overflows).

In one embodiment, the optical measuring unit 2 is the confocal laser scanning microscopy (CLSM) or the combination of the femtosecond laser and the confocal microscopy. The principle of the confocal laser scanning microscopy is to exclude the lights not within the focal plane via the pinhole. Compared with the conventional fluorescence microscopy, the technology of the confocal laser scanning microscopy can remove the lights, of the image, not within the focal plane, so the confocal laser scanning microscopy can be used to observe each of the layers of the sample, which can significantly increase the contrast ratio, the resolution and the fluorescence detecting signal-to-noise ratio of the image.

In one embodiment, the optical measuring unit 2 includes at least one visual module and the visual module may be a CCD (charge-coupled device) camera or a CCD image sensor, which can capture the image of the fluid material 4. In one embodiment, the visual module may be an upper visual module and a lower visual module. The upper visual module can capture the top image of the fluid material 4 and the lateral visual module can capture the lateral image of the fluid material 4. The above top image and the lateral image are provided for the calculating unit 3 and the calculating unit 3 obtain the $N^{th}$ 3D fluid signal according to the top image and the lateral image.

The calculating unit 3 can control the fluid dispensing amount of the fluid dispensing unit 1 according to the $N^{th}$ 3D fluid signal provided by the optical measuring unit 2. In one embodiment, the calculating unit 3 can obtain the state of the fluid material 4 after receiving the $N^{th}$ 3D fluid signal. The calculating unit 3 compares the state of the fluid material 4 with the default fluid material state. If the state of the fluid material 4 fails to conform to the default fluid material state, the calculating unit 3 transmits a $N^{th}$ fluid amount adjustment signal to the fluid dispensing unit 1. In this way, the fluid dispensing unit 1 can adjust the fluid dispensing amount thereof according to the $N^{th}$ fluid amount adjustment signal.

The calculating unit 3 can further have other functions for managing the manufacturing process. In one embodiment, the fluid dispensing unit 1 may be further provided with a residual amount sensor (not shown in the drawings) disposed therein. The residual amount sensor is electrically connected to the calculating unit 3. When the residual amount of the fluid material 4 in the fluid dispensing unit 1 is too low, the residual amount sensor can transmit an insufficient residual amount signal to the calculating unit 3 and the calculating unit 3 can transmit a signal or a warning signal to the technician. In this way, the technician can add the fluid material 4 to the fluid dispensing unit 1 or replace the container of the fluid material 4 of the fluid dispensing unit 1.

The optical measuring unit 2 dynamically detects the state of the fluid material 4 and transmits the $N^{th}$ 3D fluid signal to the calculating unit 3, so the calculating unit 3 dynamically transmits the signals to the fluid dispensing unit 1 according to the $N^{th}$ 3D fluid signal so as to adjust the fluid dispensing amount of the fluid dispensing unit 1 at any time. Via the above structure, the technician can understand the state of the fluid material 4 dispensed by the fluid dispensing unit 1 and adjust the fluid dispensing amount at any time during the process of dispensing the fluid material 4, which can solve the problems, of prior art, that the defects of products may be incurred because the state of the fluid material is hard to control.

In one embodiment, after the fluid dispensing unit 1 adjusts the fluid dispensing amount thereof, the volume or the weight of the fluid material 4 can conform to or be close to the default fluid material state so as to execute the $N+1^{th}$ dispensing step. For instance, the $N+1^{th}$ dispensing step can be performed after the volume or the weight of the fluid material 4 conforms to 95%~105% of the default fluid material state. In other words, the volume or the weight of the fluid material 4 provided by the $N+1^{th}$ dispensing step is 95%~105% of the default fluid material state. Preferably, the volume or the weight of the fluid material 4 provided by the $N+1^{th}$ dispensing step may be 97%~103% of the default fluid material state. More preferably, the volume or the weight of the fluid material 4 provided by the $N+1^{th}$ dispensing step may be 99%~101% of the default fluid material state. The best situation is that the volume or the weight of the fluid material 4 provided by the $N+1^{th}$ dispensing step may be equal to 100% of the default fluid material state.

The default fluid material state can be defined by the currently available methods. For example, the default fluid material state, for a specific chip and a specific substrate, can be defined according to the previous dispensing experience. That is to say, the default fluid material state is not constant, but can be changed according to the type of the chip and the type of the substrate. In this embodiment, the default fluid material state can be proper fluid volume, fluid weight, height of the fluid material 4 in the gap, width of the fluid material 4 in the gap, or the ratio of the space, filled with the fluid material 4, of the gap to the total space of the gap, etc.

The substrate 6 adopted by the intelligent dispensing adjustment system according to the embodiments of the present invention is not limited. Regarding the type of the substrate 6, the substrate 6 may be a glass substrate, a silicon substrate, a sapphire substrate, a substrate having an integrated circuit, a GaAs substrate, a substrate applied to a display, a soft polyimide thin-film substrate or other suitable substrates. Regarding the size of the substrate 6, the substrate 6 may be 6-inch, 8-inch or other similar sizes. Regarding the thickness of the substrate 6, the substrate 6 may be extremely low, such as a thin-film substrate or have other similar thickness.

Various electronic components and circuits can be disposed on and distributed over the substrate 6, such as connecting wiring (pad), boding pad or other proper electronic components. In one embodiment, the substrate 6 is provided with a connecting wiring, such as copper conductive wiring or copper-alloy conducting wiring, which may be covered by the solder resist in order to extend the electrical connection area thereof and form a cable for electrical connection.

The type of the chip 5 adopted by the intelligent dispensing adjustment system according to the embodiments of the present invention is not limited, which may be a LED chip including three colors (RGB). There is a gap between the chip 5 and the substrate 6. The gaps between different chips and different substrates may have different sizes and shapes. The gaps corresponding to different positions between the chip 5 and the substrate 6 may also have different sizes and shapes. Regarding the shape of the chip 5, the chip 5 may be rectangular or of other shapes. In one embodiment, the chip 5 is rectangular, and there are a first side, a second side, a third side and a fourth side between the rectangular chip 5 and the substrate 6. In one embodiment, the first side and the second side serve as the fluid dispensing end 7, and the third side and the fourth side serve as the fluid diffusing end 8. In one embodiment, the first side, the second side and the third side serve as the fluid dispensing end 7 and the fourth side serves as the fluid diffusing end 8.

For instance, the installation position and the way of installing the fluid dispensing unit 1 are not limited. The fluid material 4 can be injected into the fluid dispensing end 7 between the chip 5 and the substrate 6. With a view to enhance the packaging efficiency, the fluid dispensing unit 1 is preferably disposed at the side close to the fluid dispensing end 7 and can move to the position corresponding to the fluid diffusing end 7 so as to perform fluid dispensing for multiple times.

For example, in one embodiment, the chip 5 is rectangular, and there are four sides between the rectangular chip 5 and the substrate 6. At least one of the four sides serves as the fluid dispensing end 7 and the others of the four sides serve as the fluid diffusing end 8.

Figure 3:
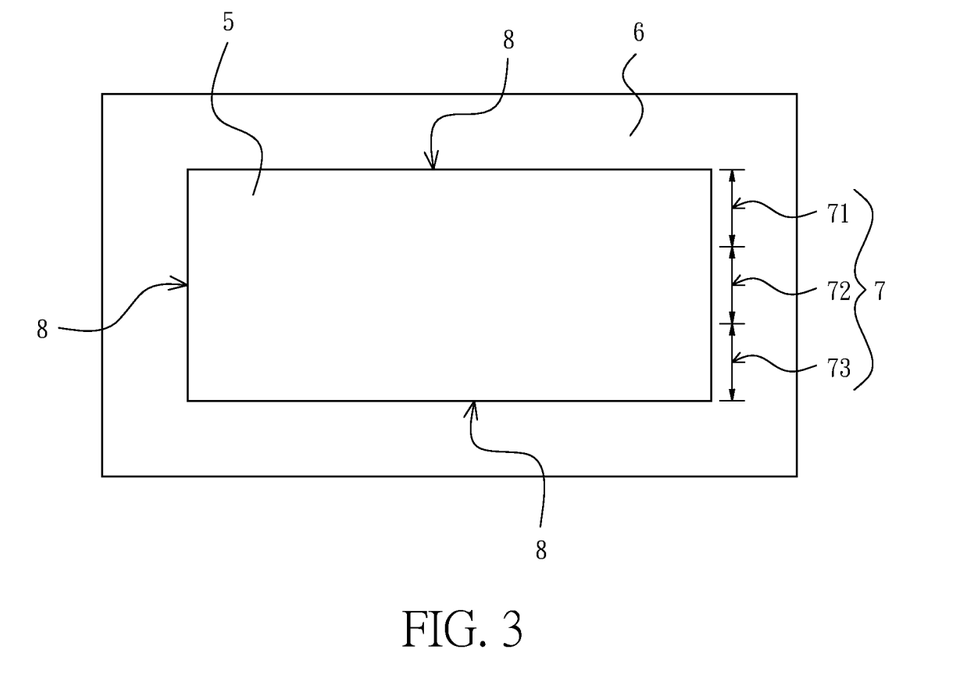
FIG. 3 is the schematic view of an intelligent dispensing adjustment method for filling a target area (the gap between the chip and the substrate) with a fluid material in accordance with one embodiment of the present invention.

Please refer to FIG. 3, which is the schematic view of an intelligent dispensing adjustment method for filling a target area (the gap between the chip and the substrate) with a fluid material in accordance with one embodiment of the present invention. FIG. 3 shows the first embodiment of the intelligent dispensing adjustment method according to the present invention.

The first embodiment includes: a $N^{th}$ dispensing step, a $N^{th}$ detecting step, a $N^{th}$ adjusting step and a $N+1^{th}$ dispensing step; N is a constant. Moreover, if necessary, the first embodiment may further include a $N+1^{th}$ detecting step, a $N+1^{th}$ adjusting step and a $N+2^{th}$ dispensing step. The total quantity of the dispensing steps depends on the sizes of the chip 5 and the substrate 6, which can be adjusted according to actual requirements. In this embodiment, the total quantity of the dispensing steps is three; in other words, N, N+1 and N+2 are 1, 2 and 3 respectively. However, this embodiment is just for illustration instead of limitation. The following content will describe the details of each of the steps.

Regarding the $1^{st}$ dispensing step, the fluid dispensing unit 1 dispenses the glue into the $1^{st}$ fluid dispensing end 71 between the chip 5 and the substrate 6. Afterward, the glue can diffuse toward the fluid diffusing end 8 between the chip 5 and the substrate 6 via capillary so as to fill the gap between the chip 5 and the substrate 6 with the glue. The position of the $1^{st}$ fluid dispensing end 71 is not limited. In this embodiment, the chip 5 is rectangular and the position of the $1^{st}$ fluid dispensing end 71 can be at any one of the sides between the rectangular chip 5 and the substrate 6. If one of the sides is divided into the middle portion and two lateral portions, the position of the $1^{st}$ fluid dispensing end 71 may be at the middle portion or one of the lateral portions. Please refer to FIG. 2, in this embodiment, the $1^{st}$ fluid dispensing end 71 is at one of the lateral portions of one of the sides (i.e., one of the corners of the chip 5).

Regarding the $1^{st}$ detecting step, the optical measuring unit 2 dynamically detects the state of the glue in the gap between the chip 5 and the substrate 6, and transmits a $1^{st}$ 3D fluid signal to the calculating unit 3. The optical measuring unit 2 detects the volume of the glue, the weight of the glue, the height of the glue in the gap, the width of the glue in the gap and the ratio of the space, filled with the glue, of the gap to the total space of the gap, etc.

It should be noted that in this embodiment, the $1^{st}$ detecting step is executed after the $1^{st}$ dispensing step, but the quantity of the dispensing steps, and the order of the dispensing steps and the detecting steps are not limited. For instance, the detecting step can be performed for one time after two dispensing steps have been executed. In another embodiment, the detecting step can be performed for one time after three dispensing steps have been executed. In still another embodiment, the detecting step can be performed for one time after four dispensing steps have been executed. That is to say, the detecting step may not be implemented right after one dispensing step.

Regarding the $1^{st}$ adjusting step, the calculating unit 3 can control the glue dispensing amount of the fluid dispensing unit 1 according to the $1^{st}$ 3D fluid signal. When the $1^{st}$ 3D fluid signal indicates that the insufficient glue state occurs, the calculating unit 3 transmits an expansion signal to the fluid dispensing unit 1 so as to increase the glue dispensing amount of the fluid dispensing unit 1. When the ist 3D fluid signal indicates that the glue overflowing state occurs, the calculating unit 3 transmits a retraction signal to the fluid dispensing unit 1 so as to decrease the glue dispensing amount of the fluid dispensing unit 1. The insufficient glue state may mean that the glue volume is insufficient, the fluid weight is insufficient, the height of the glue in the gap is too low, the width of the glue in the gap is too low, or the ratio of the space, filled with the glue, of the gap to the total space of the gap is too low. Similarly, the glue overflowing state may mean that the glue volume is too high, the fluid weight is too high, the height of the glue in the gap is too high, the width of the glue in the gap is too large, or the ratio of the space, filled with the glue, of the gap to the total space of the gap is too high.

Regarding the $2^{nd}$ dispensing step, the flue dispensing unit 1 adjusted by the calculating unit 3 can dispense the glue into the $2^{nd}$ fluid dispensing end 72 between the chip 5 and the substrate 6.

In this embodiment, two dispensing steps can be executed first and then the $3^{rd}$ (final) dispensing step can be performed after the adjusting step. The positions of the targets of the three dispensing steps are not limited. For instance, two dispensing steps can be orderly executed for the $1^{st}$ fluid dispensing end 71 and the $2^{nd}$ fluid dispensing end 72. After the adjusting step is performed, the final dispensing step can be executed for the $3^{rd}$ fluid dispensing end 71. Alternatively, two dispensing steps can be orderly executed for the $1^{st}$ fluid dispensing end 71 and the $3^{rd}$ fluid dispensing end 73. After the adjusting step is performed, the final dispensing step can be executed for the $2^{nd}$ fluid dispensing end 72.

In addition to the above steps, the method may further include a $2^{nd}$ detecting step, $2^{nd}$ adjusting step and a $3^{rd}$ dispensing step.

Regarding the $2^{nd}$ detecting step, the optical measuring unit 2 dynamically detects the state of the glue in the gap between the chip 5 and the substrate 6, and transmit a $2^{nd}$ 3D fluid signal to the calculating unit 3. The optical measuring unit 2 detects the glue volume, the glue weight, the height of the glue in the gap, the width of the glue in the gap and the ratio of the space, filled with the glue, of the gap to the total space of the gap, etc.

Regarding the $2^{nd}$ adjusting step, the calculating unit 3 controls the glue dispensing amount of the fluid dispensing unit 1 according to the $2^{nd}$ 3D fluid signal.

Regarding the $3^{rd}$ dispensing step, the fluid dispensing unit 1 adjusted by the calculating unit 3 dispenses the glue into the $3^{rd}$ fluid dispensing end 73 between the chip 5 and the substrate 6.

In this embodiment, the $1^{st}$ dispensing step is executed first. Then, the $2^{nd}$ dispensing step is performed after the $1^{st}$ adjusting step is executed. Afterward, the $3^{rd}$ dispensing step is executed after the $2^{nd}$ adjusting step is performed. The three dispensing steps may be executed for different positions. For instance, the $1^{st}$ dispensing step is performed for the Pt fluid dispensing end 71. Then, the $2^{nd}$ dispensing step is performed for the $3^{rd}$ fluid dispensing end 73 after the $1^{st}$ adjusting step is executed. Next, the $3^{rd}$ dispensing step is performed for the $2^{nd}$ fluid dispensing end 72 after the $2^{nd}$ adjusting step is executed.

It should be noted that the $1^{st}$ fluid dispensing end 71, the $2^{nd}$ fluid dispensing end 72 and the $3^{rd}$ fluid dispensing end 73 are at one of the four sides between the chip 5 and the substrate 6, but the above structure can be changed according to actual requirements. For instance, the $1^{st}$ fluid dispensing end 71, the $2^{nd}$ fluid dispensing end 72 and the $3^{rd}$ fluid dispensing end 73 may be at any two of the four sides respectively or any three of the four sides respectively.

In this embodiment, the dispensing result is as shown in FIG. 2, the glue can be evenly distributed over the gap between the chip 5 and the substrate 6, which can solve the problems, of prior art, that the defects of products may be incurred because the state of the fluid material is hard to control (e.g., the fluid material is insufficient or overflows).

Please refer to FIG. 4~FIG. 7, which are schematic views of an intelligent dispensing adjustment method for filling a target area (a groove) with a fluid material in accordance with another embodiment of the present invention. FIG. 4~FIG. 7 are the second embodiment of the present invention. The intelligent dispensing adjustment method according to the present invention can be applied to fill up various types of grooves 10 without being limited by the length, width, depth, shape (e.g., a curved groove) and material (e.g., metal, rubber, glass, etc.) of the grooves 10. For example, the method according to the present invention can be applied to filling up the groove of a semiconductor substrate, the groove of a circuit board, the groove of a spliced panel, the groove of a frame, etc.

The second embodiment includes: a $N^{th}$ dispensing step, a $N^{th}$ detecting step, a $N^{th}$ adjusting step and a $N+1^{th}$ dispensing step; N is a constant. Moreover, if necessary, the second embodiment may further include a $N+1^{th}$ detecting step, a $N+1^{th}$ adjusting step and a $N+2^{th}$ dispensing step. The total quantity of the dispensing steps depends on the state (e.g., length, width, depth, shape, position, etc.) of the groove, which can be adjusted according to actual requirements. In this embodiment, the groove 10 of the target object 9 can be considered the target area.

Figure 4:
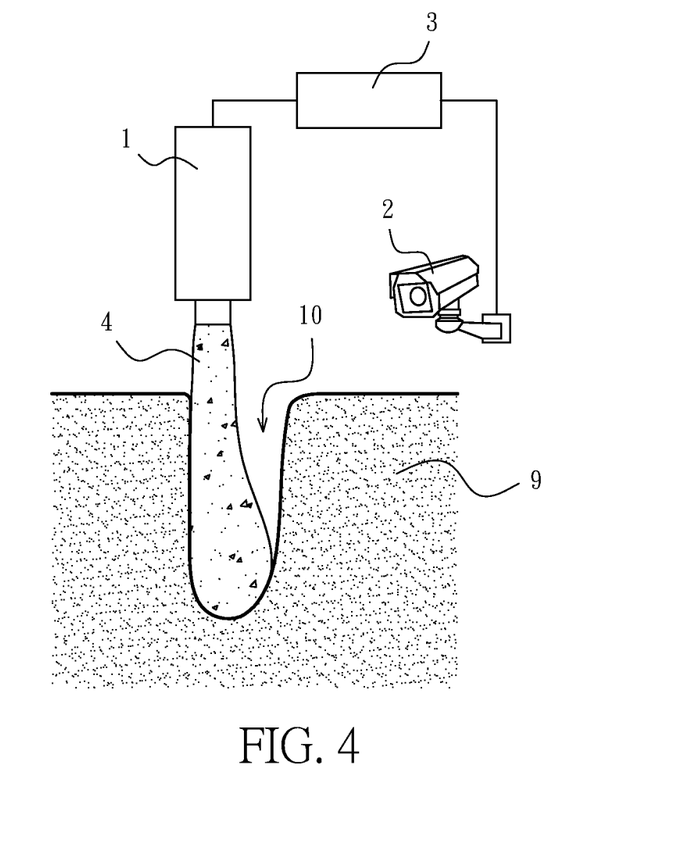
FIG. 4 is the schematic view of performing a $1^{st}$ dispensing step for the target area (a groove) in accordance with another embodiment of the present invention.

Please refer to FIG. 4, regarding the $1^{st}$ dispensing step, the fluid dispensing unit 1 dispenses the fluid material 4 into the groove 10 of the target object 9. In this embodiment, the installation position and the way of installing the fluid dispensing unit 1 are not limited. However, in order to more easily dispense the fluid material 4 into the groove 10, it is preferred that the fluid dispensing unit 1 can be movable and disposed over the center of the groove 10. Alternatively, the fluid dispensing unit 1 may be movable and disposed over one of the two sides of the groove 10.

Figure 5:
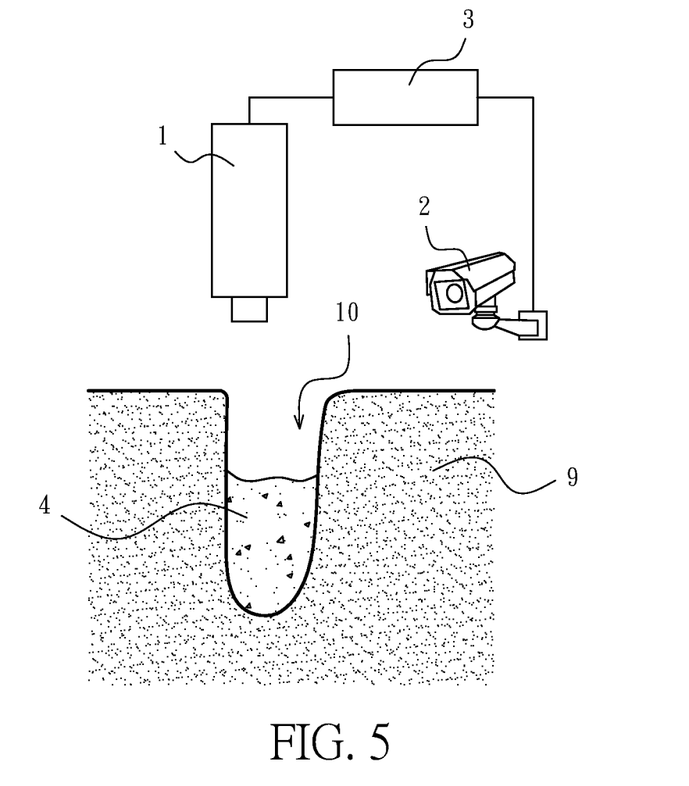
FIG. 5 is the schematic view of performing a detecting step for the target area (the groove) in accordance with another embodiment of the present invention.

Please refer to FIG. 5, regarding the $1^{st}$ detecting step, the optical measuring unit 2 dynamically detects the state of the fluid material 4 in the groove 10 and transmits a $1^{st}$ 3D fluid signal to the calculating unit 3. The optical measuring unit 2 detects the volume of the fluid material 4, the weight of the fluid material 4, the height of the fluid material 4 in the groove 10, the width of the fluid material 4 in the groove 10 and the ratio of the space, filled with the fluid material 4, of the groove 10 to the total space of the groove 10, etc.

Regarding the $1^{st}$ adjusting step, the calculating unit 3 can obtain the state of the fluid material 4 after receiving the $1^{st}$ 3D fluid signal. The calculating unit 3 compares the state of the fluid material 4 with the default fluid material state. If the state of the fluid material 4 fails to conform to the default fluid material state, the calculating unit 3 transmits a $1^{st}$ fluid amount adjustment signal to the fluid dispensing unit 1. Then, the fluid dispensing unit 1 can adjust the fluid dispensing amount thereof according to the $1^{st}$ fluid amount adjustment signal. In this embodiment, the fluid material 4 may be glue. When the $1^{st}$ 3D fluid signal indicates that the insufficient glue state occurs, the calculating unit 3 transmits an expansion signal to the fluid dispensing unit 1 so as to increase the glue dispensing amount of the fluid dispensing unit 1. When the $1^{st}$ 3D fluid signal indicates that the glue overflowing state occurs, the calculating unit 3 transmits a retraction signal to the fluid dispensing unit 1 so as to decrease the glue dispensing amount of the fluid dispensing unit 1. The insufficient glue state may mean that the glue volume is insufficient, the fluid weight is insufficient, the height of the glue in the groove 10 is too low, the width of the glue in the groove 10 is too low, or the ratio of the space, filled with the glue, of the groove 10 to the total space of the groove 10 is too low. Similarly, the glue overflowing state may mean that the glue volume is too high, the fluid weight is too high, the height of the glue in the groove 10 is too high, the width of the glue in the groove 10 is too large, or the ratio of the space, filled with the glue, of the groove to the total space of the groove 10 is too high (the glue overflows form the groove 10).

In this embodiment, the default fluid material state can be defined by the currently available methods. For example, the default fluid material state, for a specific target object 9 having the groove 10, can be defined according to the previous dispensing experience of filling the similar groove. That is to say, the default fluid material state is not constant, but can be changed according to the state of the groove 10. In this embodiment, the default fluid material state can be proper fluid volume, fluid weight, height of the fluid material in the groove 10, width of the fluid material in the groove 10, or the ratio of the space, filled with the fluid material, of the groove 10 to the total space of the groove 10, etc.

Figure 6:
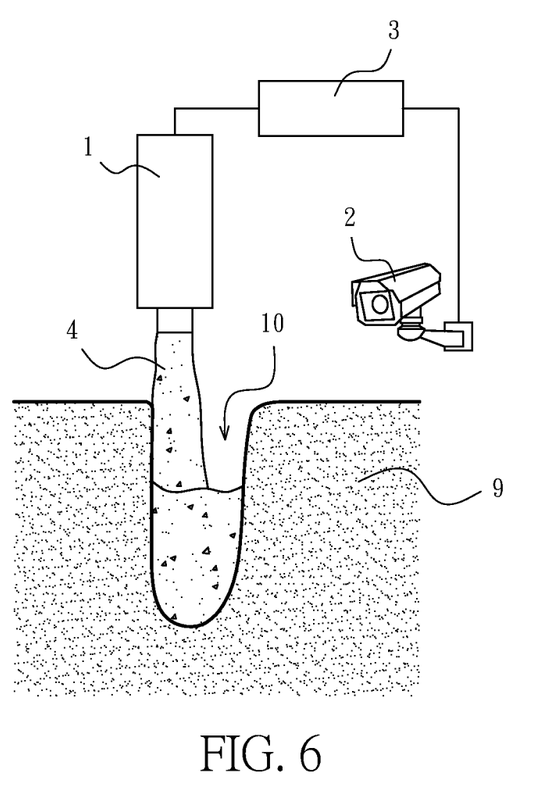
FIG. 6 is the schematic view of performing a $2^{nd}$ dispensing step for the target area (the groove) in accordance with another embodiment of the present invention.

Please refer to FIG. 6, regarding the $2^{nd}$ dispensing step, the flue dispensing unit 1 adjusted by the calculating unit 3 can dispense the glue into the groove 10.

In addition to the above steps, the method may further include a $2^{nd}$ detecting step, $2^{nd}$ adjusting step and a $3^{rd}$ dispensing step if necessary. The above steps are similar to those of the first embodiment, so will not be described therein again.

Figure 7:
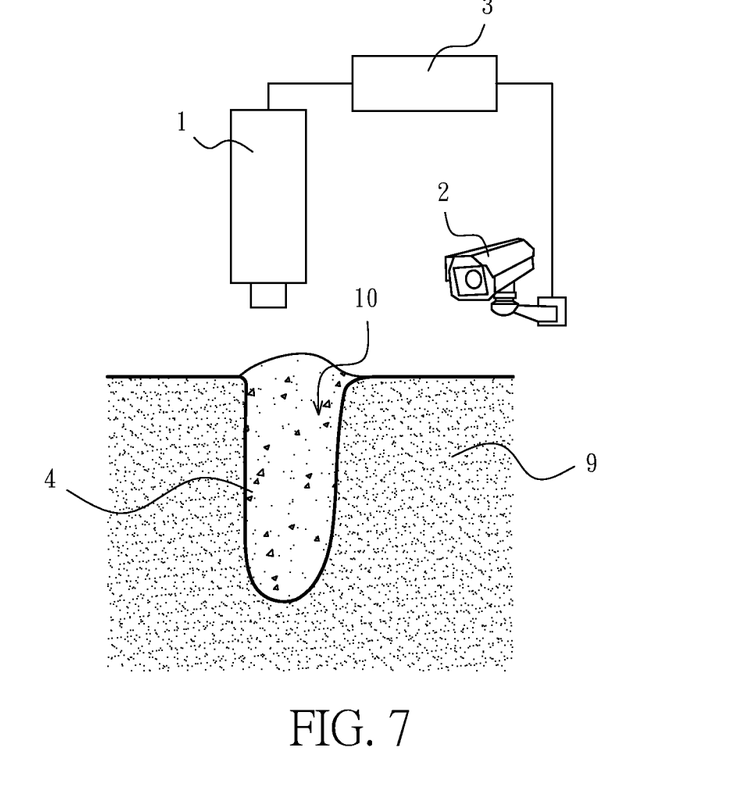
FIG. 7 is the schematic view of the result of the target area (the groove) being filled up with the fluid material in accordance with another embodiment of the present invention.

In this embodiment, the dispensing result is as shown in FIG. 7, the glue can be evenly distributed over the groove 10, which can solve the problems, of prior art, that the defects of products may be incurred because the state of the fluid material is hard to control (e.g., the fluid material is insufficient or overflows).

To sum up, the embodiments of the present invention provide an intelligent dispensing adjustment system and the method thereof, which integrates an optical measuring unit with a fluid dispensing unit and a calculating unit to form a closed loop. Therefore, the calculating unit can obtain the state of the fluid material according to the 3D information, of the fluid material, measured by the optical measuring unit. The calculating unit 3 compares the state of the fluid material with the default fluid material state. If the state of the fluid material fails to conform to the default fluid material state, the calculating unit transmits a fluid amount adjustment signal to the fluid dispensing unit, such that the fluid dispensing unit can adjust the fluid dispensing amount thereof accordingly. The intelligent dispensing adjustment system and the method thereof can adjust the fluid dispensing amount of the fluid dispensing unit by obtaining the feedback information of previously dispensing the fluid material via the closed loop, which can solve the problems, of prior art, that the defects of products may be incurred because the state of the fluid material is hard to control (e.g., the fluid material is insufficient or overflows).

The above disclosure is related to the detailed technical contents and inventive features thereof. Those skilled in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An intelligent dispensing adjustment system, comprising:
a fluid dispensing unit configured to fill a target area with a fluid material to execute a $N^{th}$ dispensing step, wherein N is a constant;
an optical measuring unit configured to dynamically image the fluid material in the target area and generate a $N^{th}$ 3-dimension fluid signal; and
a calculating unit electrically connected to the fluid dispensing unit and the optical measuring unit, and configured to receive the $N^{th}$ 3-dimension fluid signal to obtain a state of the fluid material, wherein the calculating unit compares the state of the fluid material with a predetermined fluid state value and transmits a $N^{th}$ fluid amount adjustment signal to the fluid dispensing unit, whereby the fluid dispensing unit adjusts a fluid dispensing amount thereof according to the $N^{th}$ fluid amount adjustment signal.

2. The intelligent dispensing adjustment system of claim 1, wherein the target area is a fluid input end of a gap between a chip and a substrate.

3. The intelligent dispensing adjustment system of claim 2, wherein the state of the fluid material includes a fluid volume, a fluid weight, a height of the fluid material in the gap, a width of the fluid material in the gap, or a ratio of a space, filled with the fluid material, of the gap to a total space of the gap.

4. The intelligent dispensing adjustment system of claim 1, wherein the target area is a groove.

5. The intelligent dispensing adjustment system of claim 4, wherein the state of the fluid material includes a fluid volume, a fluid weight, a height of the fluid material in the groove, a width of the fluid material in the groove, or a ratio of a space, filled with the fluid material, of the groove to a total space of the groove.

6. The intelligent dispensing adjustment system of claim 1, wherein the fluid dispensing unit is a glue dispensing unit, the fluid material is a glue, the optical measuring unit is, a confocal laser scanning microscopy, a combination of a femtosecond laser and a confocal microscopy, a confocal laser, a 3-dimension measuring device, an ultrasonic measuring device, or a laser triangulation measuring device.

7. The intelligent dispensing adjustment system of claim 1, wherein the optical measuring unit includes at least one visual module, and the visual module is a CCD (charge-coupled device) camera, a CCD image sensor, a CMOS (complementary metal-oxide-semiconductor) image sensor, a CMOS camera, an optical microscopy, a scanning electron microscopy or a transmission electron microscopy.

8. An intelligent dispensing adjustment method, comprising:
- a $N^{th}$ dispensing step, wherein a fluid dispensing unit fills a $N^{th}$ fluid input end between a chip and a substrate with a fluid material, whereby the fluid material diffuses toward a fluid diffusing end between the chip and the substrate so as to fill the gap between the chip and the substrate with the fluid material, wherein N is a constant;
- a $N^{th}$ detecting step, wherein an optical measuring unit dynamically images the fluid material in the gap between the chip and the substrate, and transmits a $N^{th}$ 3-dimension fluid signal to a calculating unit;
- a $N^{th}$ adjusting step, wherein the calculating unit controls a fluid dispensing amount of the fluid dispensing unit according to the $N^{th}$ 3-dimension fluid signal; and
- a $N+1^{th}$ dispensing step, wherein the fluid dispensing unit, adjusted by the calculating unit, fills a $N+1^{th}$ fluid input end between the chip and the substrate with the fluid material.

9. The intelligent dispensing adjustment method of claim 8, after the N+1 dispensing step, further comprising:
- a $N+1^{th}$ detecting step, wherein the optical measuring unit dynamically images the fluid material in the gap between the chip and the substrate, and transmits a $N+1^{th}$ 3-dimension fluid signal to the calculating unit;
- a $N+1^{th}$ adjusting step, wherein the calculating unit controls the fluid dispensing amount of the fluid dispensing unit according to the $N+1^{th}$ 3-dimension fluid signal; and
- a $N+2^{th}$ dispensing step, wherein the fluid dispensing unit, adjusted by the calculating unit, fills a $N+2^{th}$ fluid input end between the chip and the substrate with the fluid material.

10. An intelligent dispensing adjustment method, comprising:
- a $N^{th}$ dispensing step, wherein a fluid dispensing unit fills a groove with a fluid material in order to perform a caulking for the groove, wherein N is a constant;
- a $N^{th}$ detecting step, wherein an optical measuring unit dynamically images the fluid material in the groove, and transmits a $N^{th}$ 3-dimension fluid signal to a calculating unit; and
- a $N^{th}$ adjusting step, wherein the calculating unit controls a fluid dispensing amount of the fluid dispensing unit according to the $N^{th}$ 3-dimension fluid signal.

11. The method of claim 10 wherein the $N^{th}$ adjusting step includes transmitting an expansion signal to the fluid dispensing unit when the $N^{th}$ 3-dimension fluid signal indicates that an insufficient glue state occurs so as to increase the glue dispensing amount of the fluid dispensing unit.

12. The method of claim 10 wherein the $N^{th}$ adjusting step includes transmitting a retraction signal to the fluid dispensing unit 1 when the 3-dimension fluid signal indicates that a glue overflowing state occurs so as to decrease the glue dispensing amount of the fluid dispensing unit.

13. The method of claim 10 wherein the fluid dispensing unit used in the $N^{th}$ dispensing step is a glue dispensing unit and the fluid material is a glue, and the optical measuring unit used in the $N^{th}$ detecting step is a confocal laser scanning microscopy device.

14. The intelligent dispensing adjustment system of claim 1 wherein the optical measuring unit is disposed at a side close to a fluid diffusing end of a gap between a chip and a substrate and can move to the position corresponding to the fluid diffusing end so as to perform dynamical detection.

15. The intelligent dispensing adjustment system of claim 1, wherein the fluid dispensing unit is a glue dispensing unit, the fluid material is a glue, and the optical measuring unit is a confocal laser scanning microscopy device.

16. The intelligent dispensing adjustment system of claim 7 wherein the optical measuring unit includes an upper visual module and a lateral visual module.

17. The intelligent dispensing adjustment system of claim 16 wherein the upper visual module is configured to capture a top image of the fluid material, the lateral visual module is configured to capture a lateral image of the fluid material, and the calculating unit is configured to obtain the $N^{th}$ 3-dimension fluid signal according to the top image and the lateral image.

18. The method of claim 8 wherein the fluid dispensing unit used in the $N^{th}$ dispensing step is a glue dispensing unit and the fluid material is a glue, and the optical measuring unit used in the $N^{th}$ detecting step is a confocal laser scanning microscopy device.

19. The method of claim 8 wherein the $N^{th}$ adjusting step includes transmitting an expansion signal to the fluid dispensing unit when the $N^{th}$ 3-dimension fluid signal indicates that an insufficient glue state occurs so as to increase the glue dispensing amount of the fluid dispensing unit.

20. The method of claim 8 wherein the $N^{th}$ adjusting step includes transmitting a retraction signal to the fluid dispensing unit 1 when the 3-dimension fluid signal indicates that a glue overflowing state occurs so as to decrease the glue dispensing amount of the fluid dispensing unit.

* * * * *